(12) United States Patent
Wang (10) Patent No.: US 12,077,239 B2
(45) Date of Patent: Sep. 3, 2024

(54) FOLDING BICYCLE

(71) Applicant: OXFO LIMITED, Scotland (GB)

(72) Inventor: Xinyue Wang, New Malden (GB)

( * ) Notice: Subject to any disclaimer, the term of this patent is extended or adjusted under 35 U.S.C. 154(b) by 325 days.

(21) Appl. No.: 17/573,907

(22) Filed: Jan. 12, 2022

(65) Prior Publication Data

US 2023/0159131 A1 May 25, 2023

(30) Foreign Application Priority Data

Nov. 23, 2021 (GB) ...................................... 2116832

(51) Int. Cl.
*B62K 15/00* (2006.01)
(52) U.S. Cl.
CPC .................................. *B62K 15/008* (2013.01)
(58) Field of Classification Search
CPC ............................. B62K 15/006; B62K 15/008
See application file for complete search history.

(56) References Cited

U.S. PATENT DOCUMENTS

| 7,882,918 | B2 * | 2/2011 | Chin ...................... | B62K 11/10 |
| | | | | 280/278 |
| 8,205,902 | B2 * | 6/2012 | Uimonen ............. | B62K 15/008 |
| | | | | 280/278 |
| 9,321,500 | B2 * | 4/2016 | Wang .................... | B62K 15/006 |
| 9,475,537 | B2 * | 10/2016 | Hartmann .............. | B62K 23/06 |
| 9,963,186 | B2 * | 5/2018 | Beistegui Chirapozu ................... |
| | | | | B62K 15/008 |
| 10,053,179 | B2 * | 8/2018 | Xie .......................... | B62J 43/16 |
| 10,870,460 | B2 * | 12/2020 | Yap ........................ | B62K 21/24 |
| 11,267,527 | B2 * | 3/2022 | Ho ........................... | B62K 3/04 |

* cited by examiner

*Primary Examiner* — Brian L Swenson
(74) *Attorney, Agent, or Firm* — Sandy Uplin (57) ABSTRACT

A folding bicycle, including the bicycle frame, the connecting pillar for front fork, the front fork of bicycle, the rear fork bracket of bicycle, the lock stem, the mounting stem of lock stem, and the return spring. According to the design in the present invention, the saddle is folded, the bicycle and the handlebar are retracted and folded and the lock stem is set in sequence. The lock stem is correspondingly clamped on the front fork to tightly fix the front fork and rear fork of the bicycle together using the elasticity of the spring, which could effectively solve the problem that the folding mechanism in the folding bicycle currently available on the market is complicated, the bicycle body after being folded is larger, and the front fork and rear fork of the bicycle body cannot be put together and fixed, resulting in be difficult to carry or transport. Meanwhile, after being folded, the front wheel and the rear wheel are on the same straight line. By adjusting the height of saddle, after the height of saddle is adjusted, the movement of bicycle can be pushed, so that the portability is better and the practicability is stronger, which is more suitable for large-scale popularization and application.

10 Claims, 11 Drawing Sheets

FOLDING BICYCLE

REFERENCE TO PRIOR APPLICATION

This application claims priority to British Patent Application 2116832.3, filed on 23 Nov. 2021, which is incorporated herein by reference.

TECHNICAL FIELD

The present invention is involved with the technical field of bicycle, in particular with a folding bicycle.

BACKGROUND TECHNOLOGY

At present, there are various types of folding bicycles on the market, which meet the requirements of light weight, small size and convenient operation to some extent. For the purpose of small size after being folded, the bicycle handlebar, front and rear wheels and parts generally need be folded and retracted. The folding mechanism in the folding bicycles currently available on the market is more complicated, the bicycle body after being folded is larger, and the front fork and rear fork of the bicycle body cannot be put together and fixed, resulting in be difficult to carry or transport.

In summary, the present invention solves the existing problems by designing a folding bicycle.

CONTENT OF THE PRESENT INVENTION

The purpose of the present invention is to provide a folding bicycle to solve the above problems in the background technology.

In order to achieve the above objectives, the present invention provides the following technical solutions:

A folding bicycle, comprising the bicycle frame body, the connecting pillar for front fork, the front fork of bicycle, the rear fork bracket of bicycle, the lock stem, and the mounting stem of lock stem and the return spring. For this bicycle, the rear fork brackets of bicycle are set in two sets and they are respectively connected to the rear end of bicycle frame body through the rotation of rotating shaft symmetrically, and a shock absorber is connected between the these two sets of rear fork brackets of bicycle and is nearby the bicycle frame. These two sets of rear fork brackets of bicycle are rotated through the rotation of rotating shaft. The other side of shock absorber is connected to the side wall of bicycle frame body through the rotation of rotating shaft. The mounting stem of lock stem is connected to a set of rear fork bracket of bicycle by bolts. The outer wall of the mounting stem of lock stem is equipped with an L-shaped groove. The outer wall of the mounting stem of lock stem is corresponding to the L-shaped groove and is connected with the lock stem. A positioning protrusion is on the lock stem and is set in the inside located at the L-shaped groove. On one side of the lock stem and the outer wall of the mounting rod of lock stem, the return spring is connected. In the front end of the bicycle frame body, the lock stem is connected with the connecting pillar for front fork on the same side through the rotation of rotating shaft. The other end of the connecting pillar for front fork and the corresponding lock stem are connected to the front fork of bicycle through the rotation of shaft sleeve.

As a preferred solution of the present invention, the bicycle frame body is connected to the rotating shaft of bicycle shaft through the rotation of shaft sleeve, and both ends of the rotating shaft of bicycle respectively intersect the shaft sleeve and extend to the outer side of the bicycle frame body, fixedly connecting with a pedal connection rod. The other end of the pedal connection rod is connected with a pedal, the inner side of the pedal connection rod and the outer wall of the bicycle shaft are fixedly connected with a large gear disc, and the side wall two opposite to sets of rear fork brackets of bicycle and one side far away from the shock absorber are connected with the rear wheel through the rotation of connecting shaft, and the shaft center of the rear wheel is fixedly connected with a small gear disc, wherein the small gear disc is connected to the large gear disc through a chain.

As a preferred solution of the present invention, the end surface of the bicycle frame body is fixedly set with the support sleeve, the inside of the support sleeve slides up and down and is connected with the saddle support rod. The end of saddle support rod is fixedly connected to the saddle, the port of the support sleeve and the joint located at the support sleeve and saddle support rod are set with the lifting buckle #1.

As a preferred solution of the present invention, the side wall opposite to the bottom of the front fork of bicycle is connected with the front wheel through the rotation of rotating shaft, the end of the front fork of bicycle intersects the connecting pillar for front fork and extends to the top of the connecting pillar for front fork, connecting the handlebar support tube through a folding buckle #1, and the port of the handlebar support tube is connected with the lifting rod through the lifting buckle #2, and the end of the lifting rod extends to the inside of the handlebar support tube through the lifting buckle #2, the connection mode of the lifting rod and the handlebar support tube is a sliding connection.

As a preferred solution of the present invention, the end of the lifting rod is connected with the bicycle handlebar through the folding buckle #2, the bicycle handlebar and the lifting rod form a cross-shaped structure. The two ends of bicycle handlebar are respectively set with brake handles. The outside of brake handles are respectively connected with an instrument and a controller. The controller is equipped with a headlamp control button, a horn control button, and a deceleration and acceleration control button, respectively, and the top of front wheel and the end located at the connecting pillar for front fork are connected to the headlamp.

As a preferred solution of the present invention, the connecting pillar for front fork is of the hollow structure, and a rechargeable lithium battery is equipped inside, wherein the rechargeable lithium battery is electrically connected to the instrument, the controller and the headlamp respectively through a wire. The rear wheel is motor-driven and is electrically connected to the controller through a wire.

As a preferred solution of the present invention, the rear disc brake is equipped on the other side of the rear wheel and between the rear wheel and the rear fork bracket of bicycle. The rear disc brake controller is correspondingly equipped on the rear fork bracket of bicycle and the rear disc brake, wherein the rear disc brake controller is connected to the brake handle through a wire rope.

As a preferred solution of the present invention, the front disc brake is equipped on one side of front wheel and between the front wheel and the front fork of bicycle. The front disc brake controller is equipped on the front fork of bicycle corresponding to the front disc brake, wherein the front disc brake controller is connected to the brake handle through a wire rope.

As a preferred solution of the present invention, the inside of the bayonet of the lock stem and the lever of the front fork of bicycle are fitted in manner of a clearance fit, and the positioning protrusion is connected to the inside of the L-shaped groove through sliding connection, and the return spring and the outer wall of the mounting rod of lock stem are fitted in manner of a clearance fit.

As a preferred solution of the present invention, one side of the bicycle frame body opposite to the lock stem is connected to the side wall of the connecting pillar for front fork through a folding buckle #3, the saddle support rod and the support sleeve are on the same straight line, and the bicycle frame body, the connecting pillar for front fork and the rear fork bracket of bicycle are on the same straight line.

Compared with the existing technologies, the beneficial effects of the present invention are as follow:

1. In the present invention, according to the design, the saddle is folded, the bicycle and the handlebar are retracted and folded and the lock stem is set in sequence. Using the elasticity of the spring, the lock stem is correspondingly clamped on the front fork to tightly fix the front fork and rear fork of the bicycle together, which could effectively solve the problem that the folding mechanism in the folding bicycle currently available on the market is complicated, the bicycle body after being folded is larger, and the front fork and rear fork of the bicycle body cannot be put together and fixed, resulting in be difficult to carry or transport.

2. In the present invention, after being folded, as the bicycle frame body, the connecting pillar for front fork and the rear fork bracket of bicycle are on the same straight line, the front wheel and the rear wheel are on the same straight line, and the saddle support rod and the support sleeve are on the same straight line, by adjusting the height of saddle, after the height of saddle is adjusted, the movement of bicycle can be pushed, so that the portability is better and the practicability is stronger, which is more suitable for large-scale popularization and application.

In the figures: 1. Bicycle frame body; 2. Connecting pillar for front fork; 3. Front fork of bicycle; 4. Rear fork bracket of bicycle; 5. Lock stem; 6. Mounting rod of lock stem; 7. Return spring; 8. Positioning protrusion; 9. Rotating shaft of bicycle; 10. Pedal connection rod; 11. Pedal; 12. Large gear disc; 13. Rear wheel; 14. Support sleeve; 15. Saddle support rod; 16. Saddle; 17. Lifting buckle #1; 18. Front wheel; 19. Folding buckle #1; 20. Handlebar support tube; 21. Lifting buckle #2; 22. Lifting rod; 23. Folding buckle #2; 24. Bicycle handlebar; 25. Brake handle; 26. Instrument; 27. Controller; 28. Headlamp; 29. Rear disc brake; 30. Front disc brake; 31. Folding buckle #3; 101. Shock absorber; 102. L-shaped groove.

SPECIFIC IMPLEMENTATION MODE

In the following, the technical solutions in the embodiments of the present invention will be described clearly and completely in combination with the embodiments of the present invention. Obviously, the described embodiments are only a part of embodiments of the present invention, rather than all the embodiments. Based on the embodiments in the present invention, all other embodiments obtained by ordinary technicians in this field without creative work shall be within the protection scope of the present invention.

In order to facilitate the understanding of the present invention, the present invention will be described below in a more comprehensive manner with reference to the relevant figures, and several embodiments of the present invention will be provided. However, the present invention can be implemented in many different forms and is not limited to the embodiments described herein. On the contrary, the purpose of providing these embodiments is to make the public content of the present invention more thorough and comprehensive.

It should be noted that when a component is referred to as being "fixed to" another component, this component can be directly on the other component or there may also be a centered component. When one component is considered to be "connected to" another component, this component can be directly connected to another element or there may be a centered element. The terms "vertical", "horizontal", "left", "right" and similar expressions used herein are only for descriptive purpose.

Unless otherwise defined, all technical and scientific terms used herein have the same meaning as those commonly understood by technicians in the technical field of the present invention. The terms used in the specification of the present invention herein are only for describing specific embodiments and the purpose is not intended to limit the present invention. The term "and/or" used herein includes any and all combinations of one or more related listed items.

Refer to FIGS. 1-11. The present invention provides a technical solution:

A folding bicycle, comprising the bicycle frame body (1), the connecting pillar for front fork (2), the front fork of bicycle (3), the rear fork bracket of bicycle (4), the lock stem (5), and the mounting stem of lock stem (6) and the return spring (7), is characterized in that: the rear fork brackets of bicycle (4) are set in two groups and they are respectively connected to the rear end of bicycle frame body (1) through the rotation of rotating shaft symmetrically, and a shock absorber (101) is connected between the these two sets of rear fork brackets of bicycle (4) and is nearby the bicycle frame (1). These two sets of rear fork brackets of bicycle are rotated through the rotation of rotating shaft. The shock absorber (101) is connected to the side wall of bicycle frame body (1) through the rotation of rotating shaft. The mounting stem of lock stem (6) is connected to a set of rear fork bracket of bicycle (4) by bolts. The outer wall of the mounting stem of lock stem (6) is equipped with an L-shaped groove (102). The outer wall of the mounting stem of lock stem (6) is corresponding to the L-shaped groove (102) and is connected with the lock stem (5). A positioning protrusion (8) is on the lock stem (5) and is set in the inside located at the L-shaped groove (102). On one side of the lock stem (5) and the outer wall of the mounting rod of lock stem (6), the return spring (7) is connected. In the front end of the bicycle frame body (1), the lock stem (5) is connected with the connecting pillar for front fork (2) on the same side through the rotation of rotating shaft. The other end of the connecting pillar for front fork (2) and the corresponding lock stem (5) are connected to the front fork of bicycle (3) through the rotation of shaft sleeve.

Figure 1:
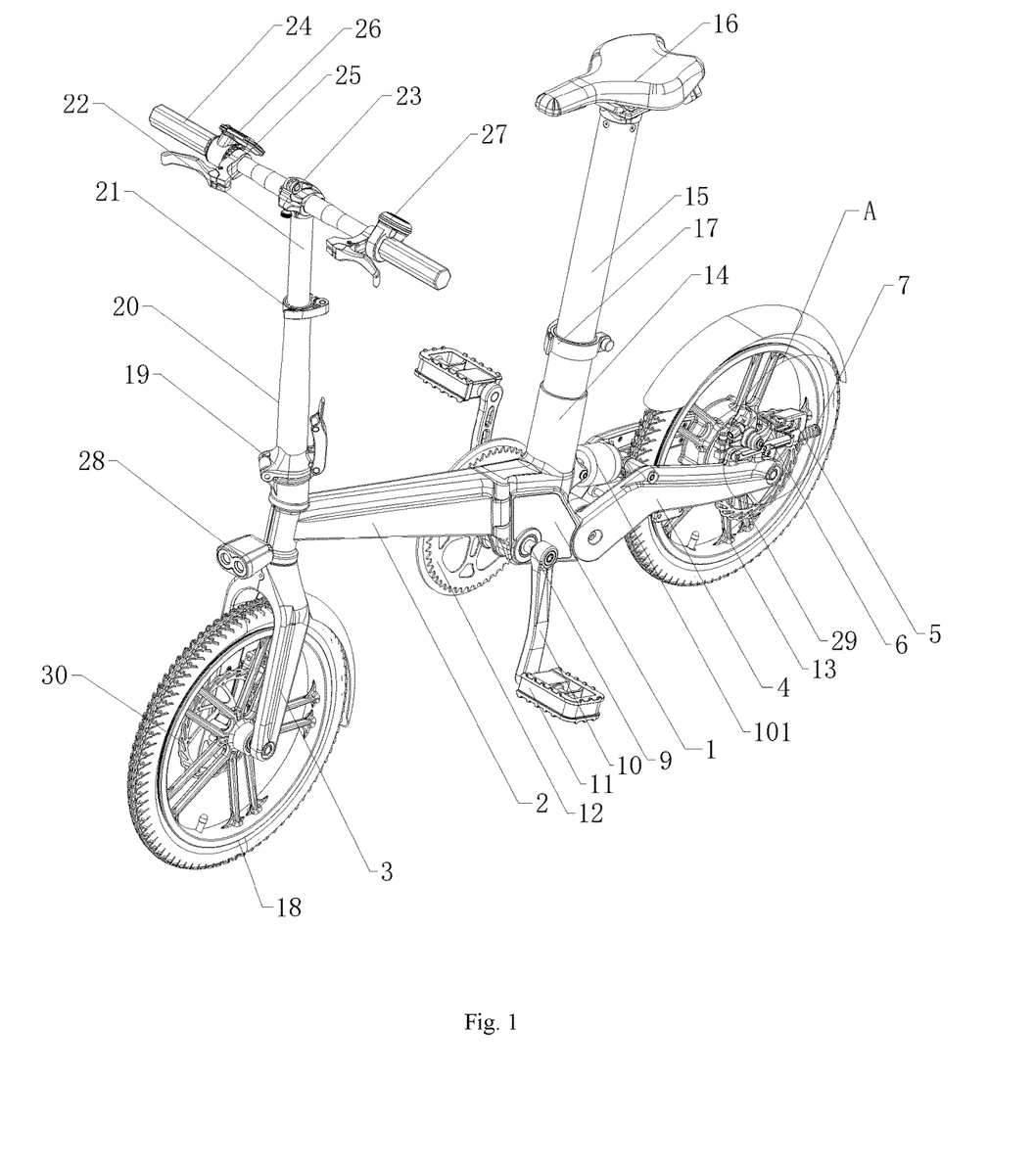
FIG. 1: the schematic diagram of the overall structure of the present invention.
Figure 2:
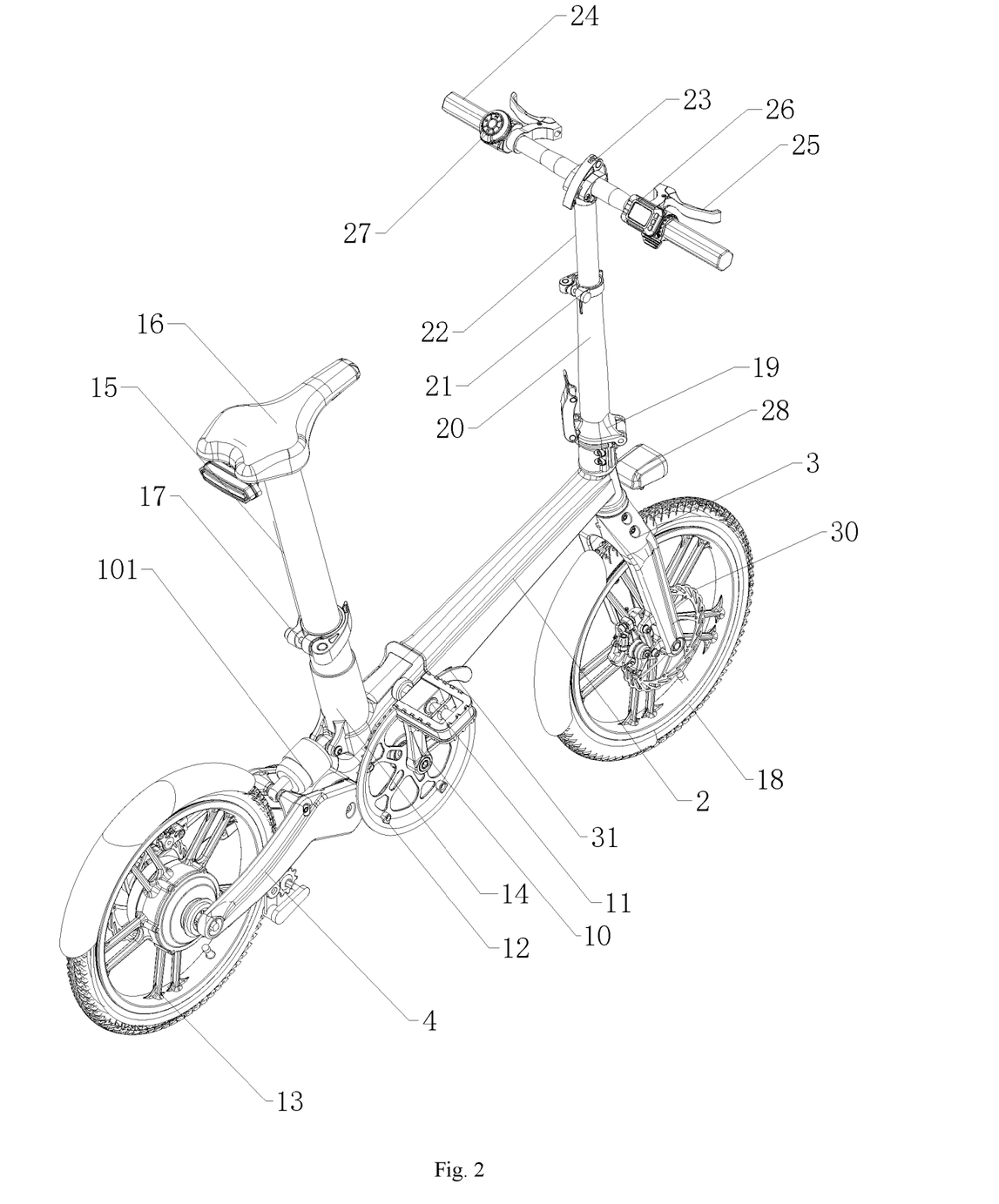
FIG. 2: the schematic diagram of the left side view of FIG. 1 of the present invention.

Refer to FIGS. 1 and 2 for the embodiment. the bicycle frame body (1) is connected to the rotating shaft of bicycle (9) through the rotation of shaft sleeve, and both ends of the rotating shaft of bicycle (9) respectively intersect the shaft sleeve and extend to the outside of the bicycle frame body (1), fixedly connecting with the pedal connection rod (10), the other end of the pedal connection rod (10) is connected with the pedal (11), and the inner side of pedal connection rod (10) and the outer wall of the rotating shaft of bicycle (9) is fixedly connected with the large gear disc (12). The side wall opposite to the two sets of rear fork brackets of bicycle (4) and one side far away from the shock absorber (101) are connected to the rear wheel (13) through the rotation of connecting shaft, and the shaft center of the rear wheel (13) is fixedly connected to the small gear disc, wherein the small gear disc is connected to the large gear disc (12) through a chain. After the bicycle is unfolded, through the pedal (11) is pedaled, the pedal connection rod (10) is driven to rotate, the rotating shaft of bicycle (9) is driven to rotate by the pedal connection rod (10), the large gear disc (12) is driven to rotate through the rotation of the rotating shaft of bicycle (9), and the small gear disc is driven to rotate by a chain through the rotation of the large gear disc (12), driving the rear wheel (13) to rotate.

Figure 3:
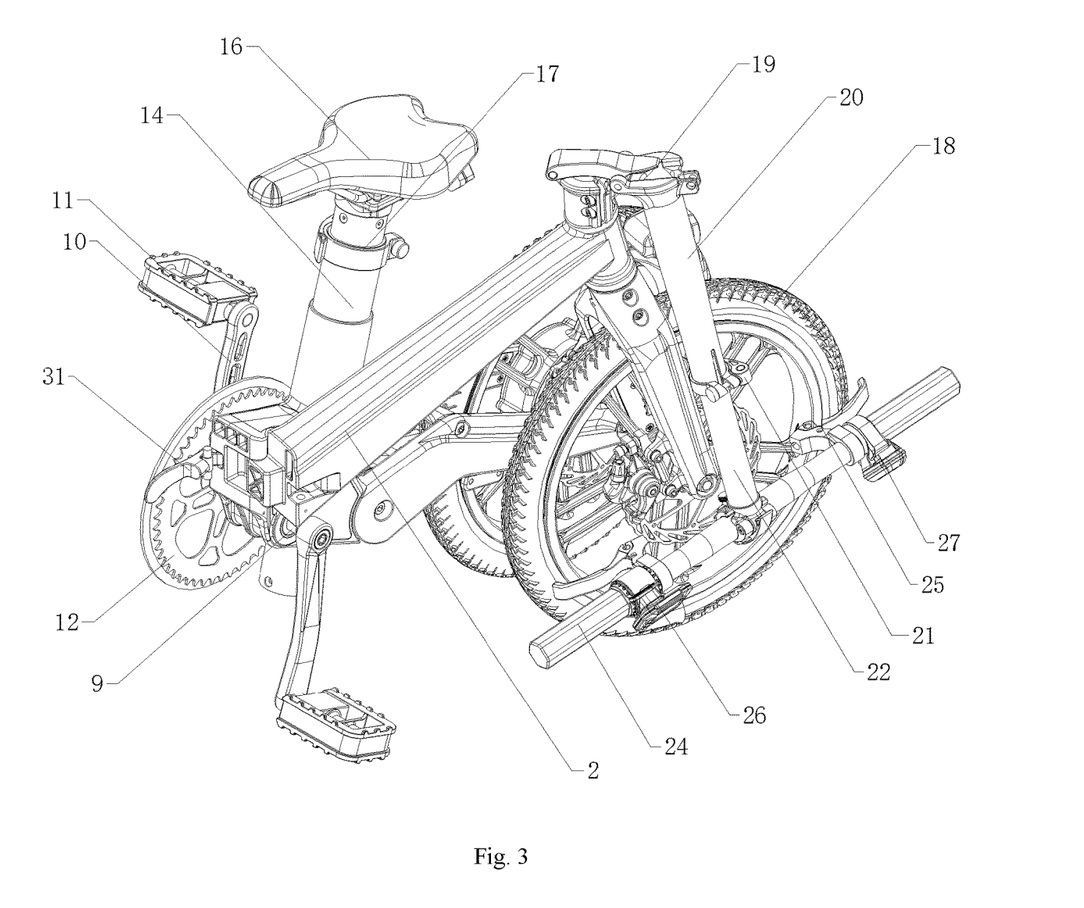
FIG. 3: the schematic diagram of the structure of folding state for the present invention.

Refer to FIGS. 1, 2 and 3 for the embodiment. The end surface of the bicycle frame body (1) is fixedly set with the support sleeve (14), the inside of the support sleeve (14) slides up and down and is connected with the saddle support rod (15). The end of saddle support rod (15) is fixedly connected to the saddle (16), the port of the support sleeve (14) and the joint located at the support sleeve (14) and saddle support rod (15) are set with the lifting buckle #1 (17). Open the lifting buckle #1 (17), press the saddle support rod (15) into the inside of the support sleeve (14) by pressing the saddle (16). After the saddle support rod (15) is pressed into the inside of the support sleeve (14), fix it by locking lifting buckle #1 (17) to complete the folding of saddle (16).

Refer to FIGS. 1, 2 and 3 for the embodiment. The port of the handlebar support tube (20) is connected with the lifting rod (22) through the lifting buckle #2 (21), and the end of the lifting rod (22) extends to the inside of the handlebar support tube (20) through the lifting buckle #2 (21), the connection mode of the lifting rod (22) and the handlebar support tube (20) is a sliding connection. Open the lifting buckle #2 (21), press the bicycle handlebar (24), and press the lifting rod (22) into the inside of the handlebar support tube (20). After the lifting rod (22) is pressed into the inside of handlebar support tube (20), fix it by locking lifting buckle #2 (21) to complete the folding of bicycle handlebar (24). Above the connecting pillar for front fork (2), connect with handlebar support tube (20) through the folding buckle #1 (19). Open the folding buckle #1 (19) and rotate the handlebar support tube (20) to achieve the folding of handlebar support tube (20), as shown in FIG. 3.

Refer to FIGS. 1 and 2 for the embodiment. The end of the lifting rod (22) is connected with the bicycle handlebar (24) through the folding buckle #2 (23), the bicycle handlebar (24) and the lifting rod (22) form a cross-shaped structure. The two ends of bicycle handlebar (24) are respectively set with brake handles (25). The outside of brake handles (25) is respectively connected with an instrument (26) and a controller (27). The controller (27) is equipped with a headlamp control button, a horn control button, and a deceleration and acceleration control button, respectively, and the top of front wheel (18) and the end located at the connecting pillar for front fork (2) are connected to the headlamp (28) for convenience of lighting. The connecting pillar for front fork (2) is of the hollow structure, and a rechargeable lithium battery is equipped inside for providing the electric energy for the bicycle, wherein the rechargeable lithium battery is electrically connected to the instrument (26), the controller (27) and the headlamp (28) respectively through a wire for convenience of observing the electric quantity of bicycle and controlling the speed of the driving wheel of electromotor. The rear disc brake is equipped on the other side of the rear wheel (13) and between the rear wheel (13) and the rear fork bracket of bicycle (4). The rear disc brake controller is correspondingly equipped on the rear fork bracket of bicycle (4) and the rear disc brake (29), wherein the rear disc brake controller is connected to the brake handle (25) through a wire rope. The front disc brake (30) is equipped on one side of front wheel (18) and between the front wheel (18) and the front fork of bicycle (3). The front disc brake controller is equipped on the front fork of bicycle (3) corresponding to the front disc brake (30), wherein the front disc brake controller is connected to the brake handle (25) through a wire rope, controlling the front and rear disc brake controller through pulling the wire rope by the brake handle (25) to achieve the control of front disc brake (30) and rear disc brake (29), braking the front wheel (18) and rear wheel (13) for the deceleration control.

Refer to FIGS. 4 to 11 for the embodiment. The saddle support rod (15) and the support sleeve (14) are on the same straight line, and the bicycle frame body (1), the connecting pillar for front fork (2) and the rear fork bracket of bicycle (4) are on the same straight line. The inside of the bayonet of the lock stem (5) and the lever of the front fork of bicycle (3) are fitted in manner of a clearance fit, and the positioning protrusion (8) is connected to the inside of the L-shaped groove (102) through sliding connection, and the return spring (7) and the outer wall of the mounting rod of lock stem (6) are fitted in manner of a clearance fit. One side of the bicycle frame body (1) opposite to the lock stem (5) is connected to the side wall of the connecting pillar for front fork (2) through a folding buckle #3 (31). Rotate the lock stem (5), rotating the positioning protrusion (8) inside the L-shaped groove (102) by 90°. At this time, through the elastic action of return spring (7), push the lock stem (5) to tightly clamp the front fork of bicycle (3).

Figure 4:
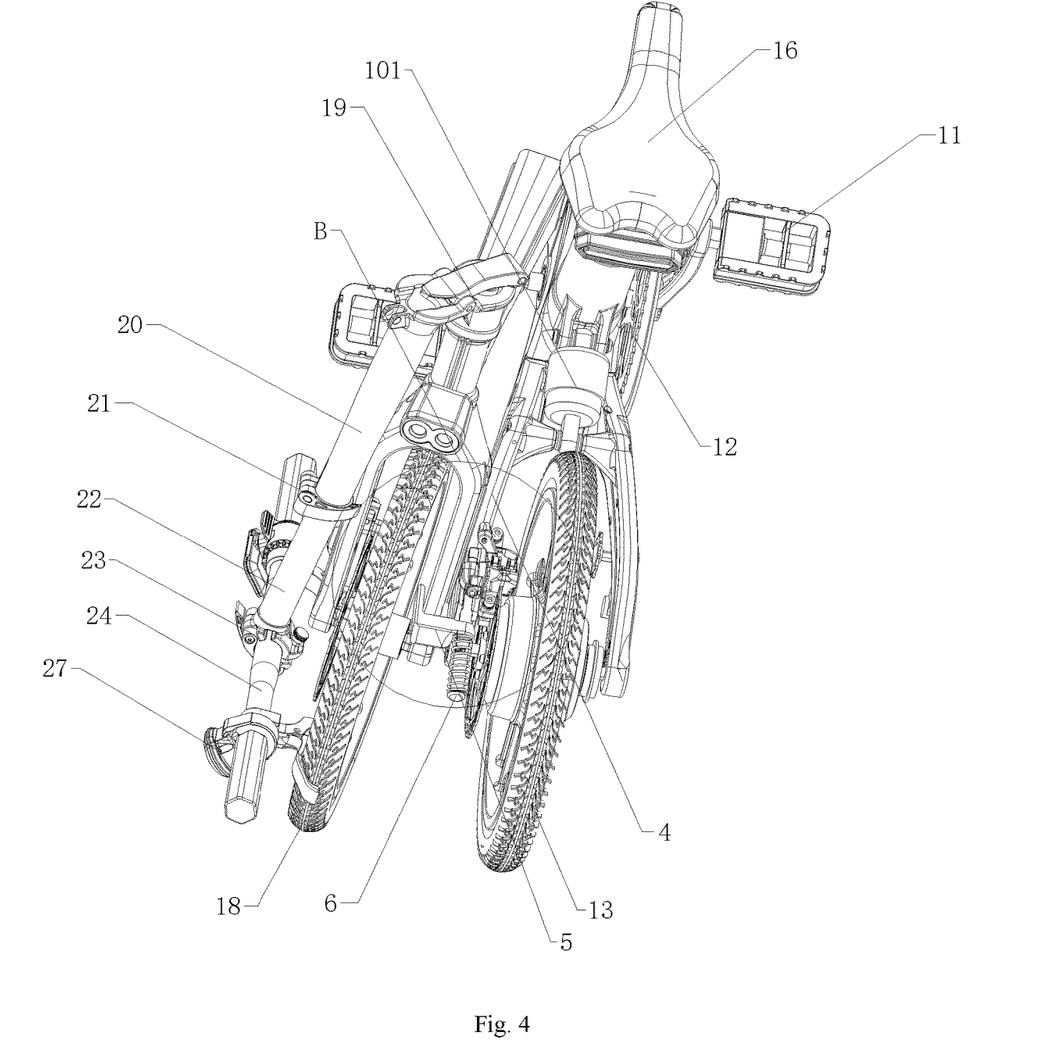
FIG. 4: the schematic diagram of the structure of FIG. 3 of the present invention.
Figure 5:
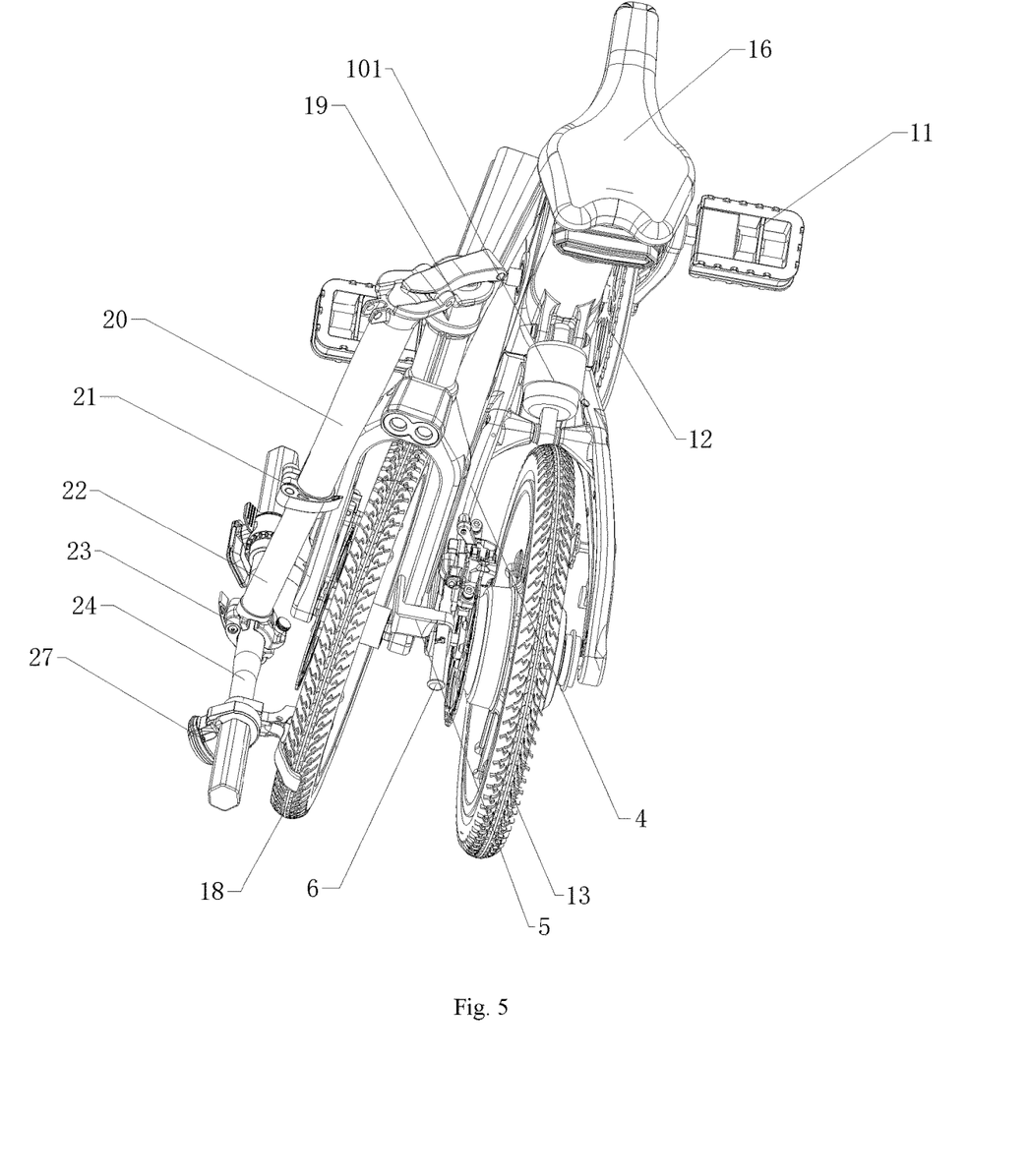
FIG. 5: the schematic diagram of the structure of FIG. 4 of the present invention.
Figure 6:
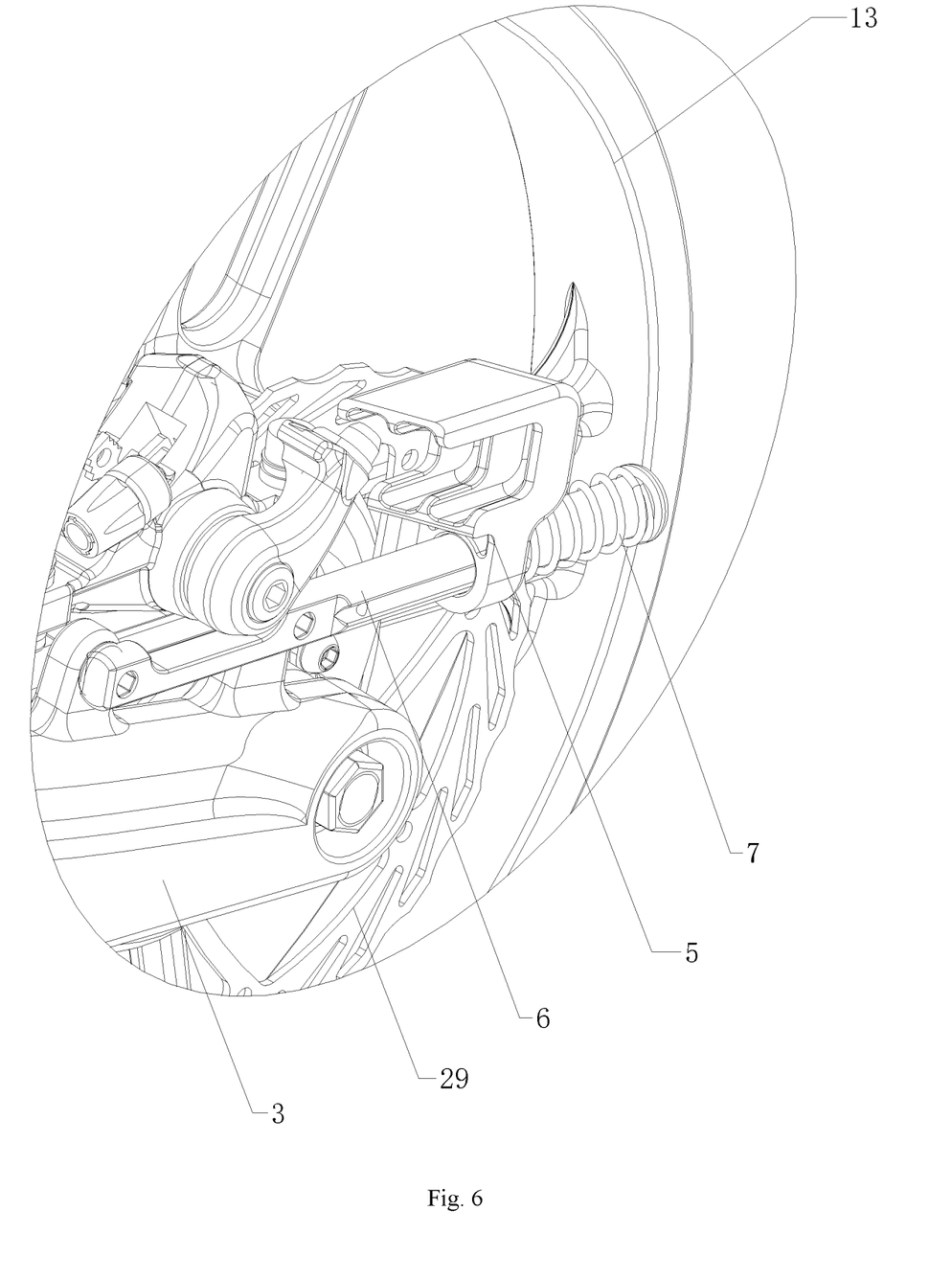
FIG. 6: the schematic diagram of the enlarged structure of the present invention A.
Figure 7:
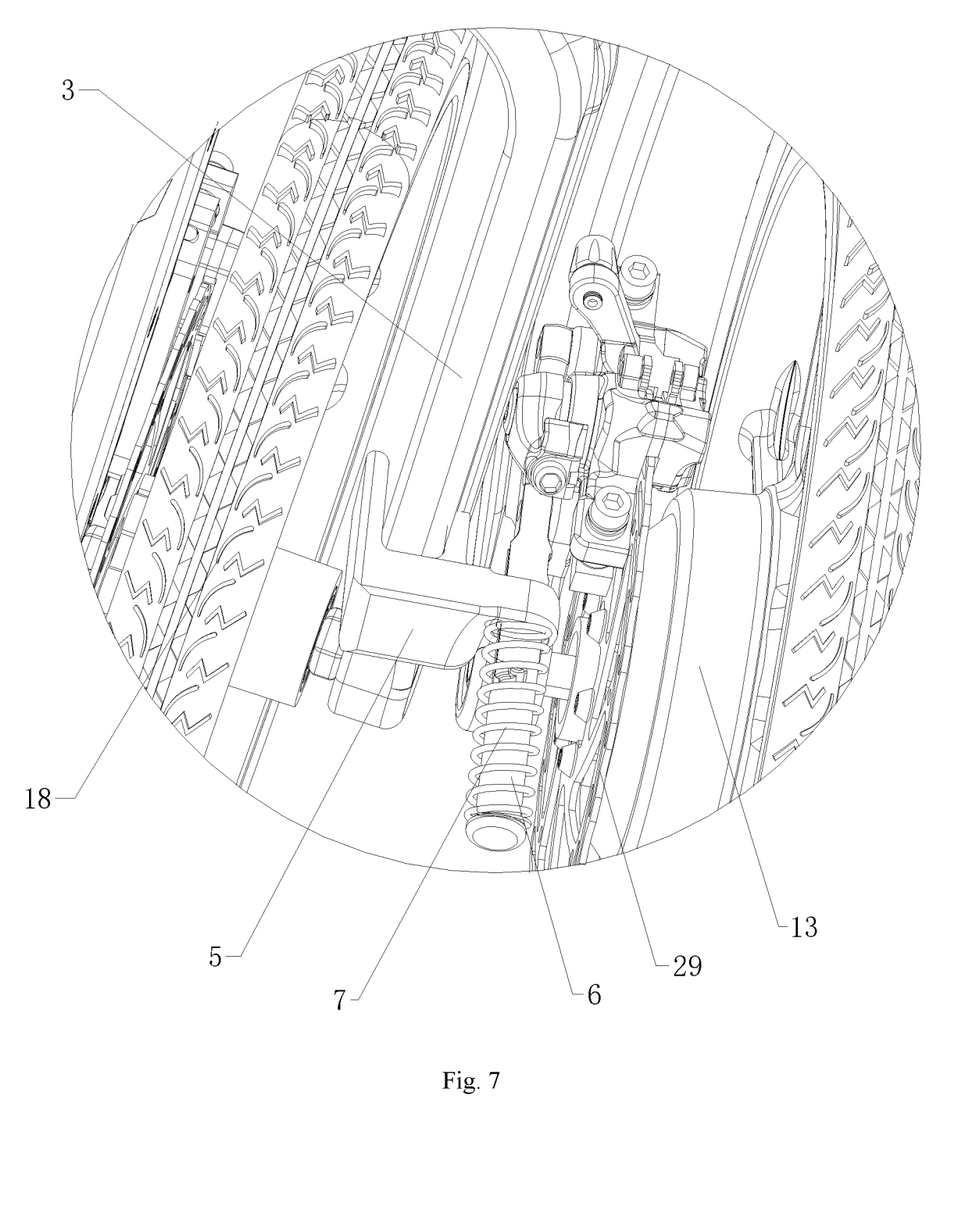
FIG. 7: the schematic diagram of the enlarged structure of the present invention B.
Figure 8:
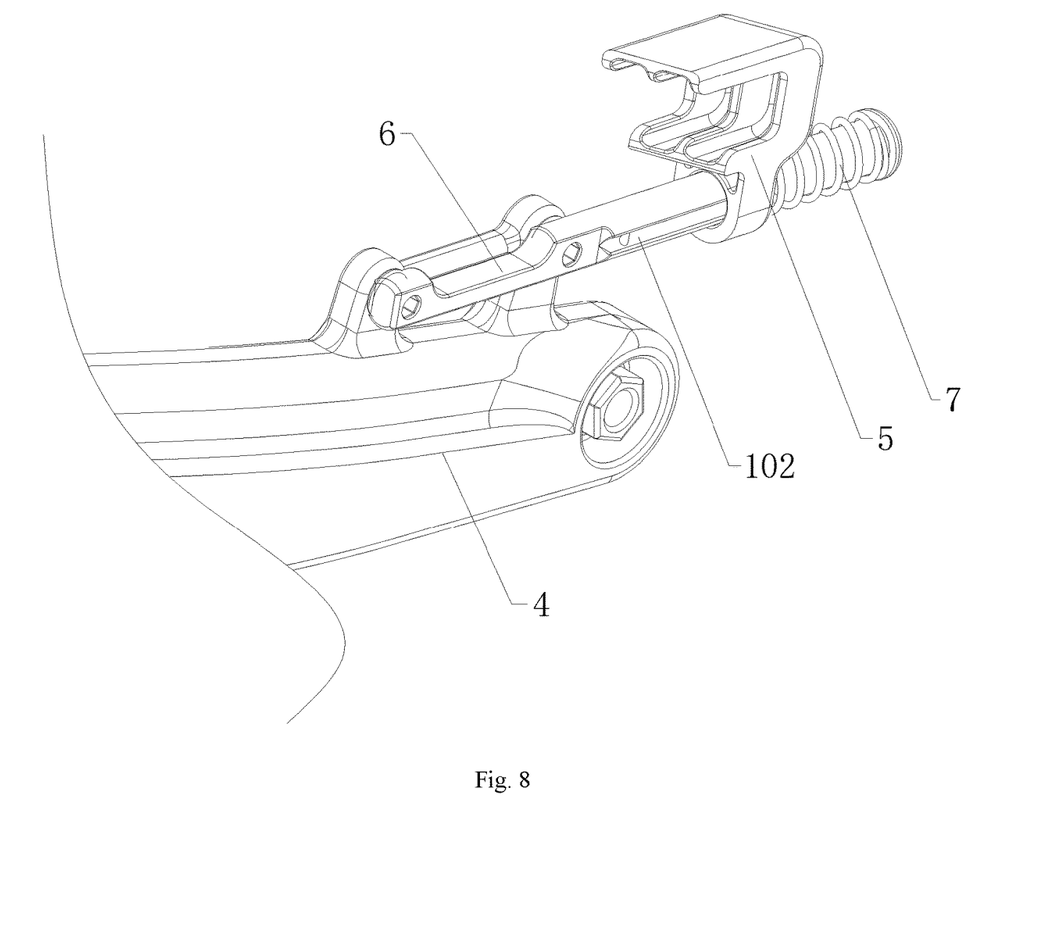
FIG. 8: the schematic diagram of the structure of FIG. 1 of the present invention.
Figure 9:
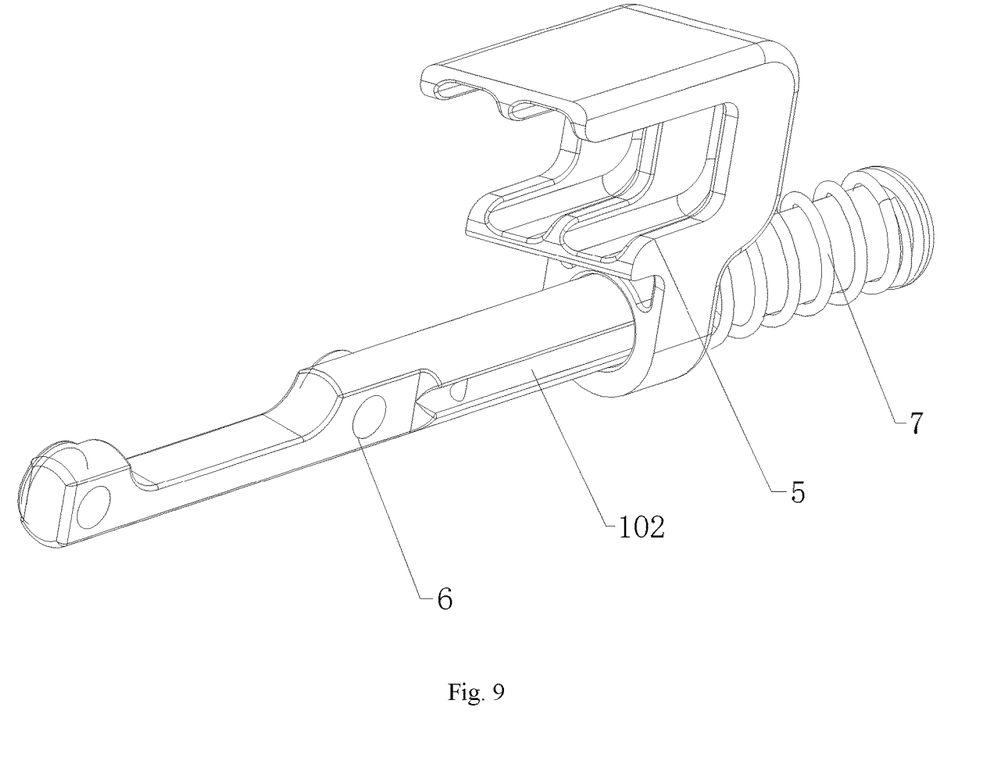
FIG. 9: the schematic diagram of the mounting structure of the mounting stem of lock stem, the lock stem and the return spring of the present invention.
Figure 10:
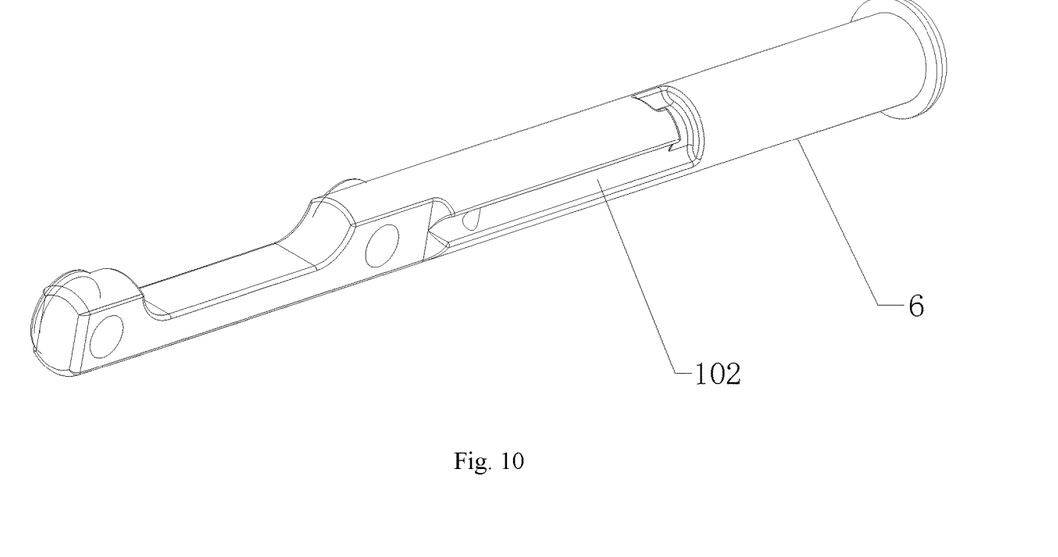
FIG. 10: the schematic diagram of the structure of the mounting stem of lock stem of the present invention.
Figure 11:
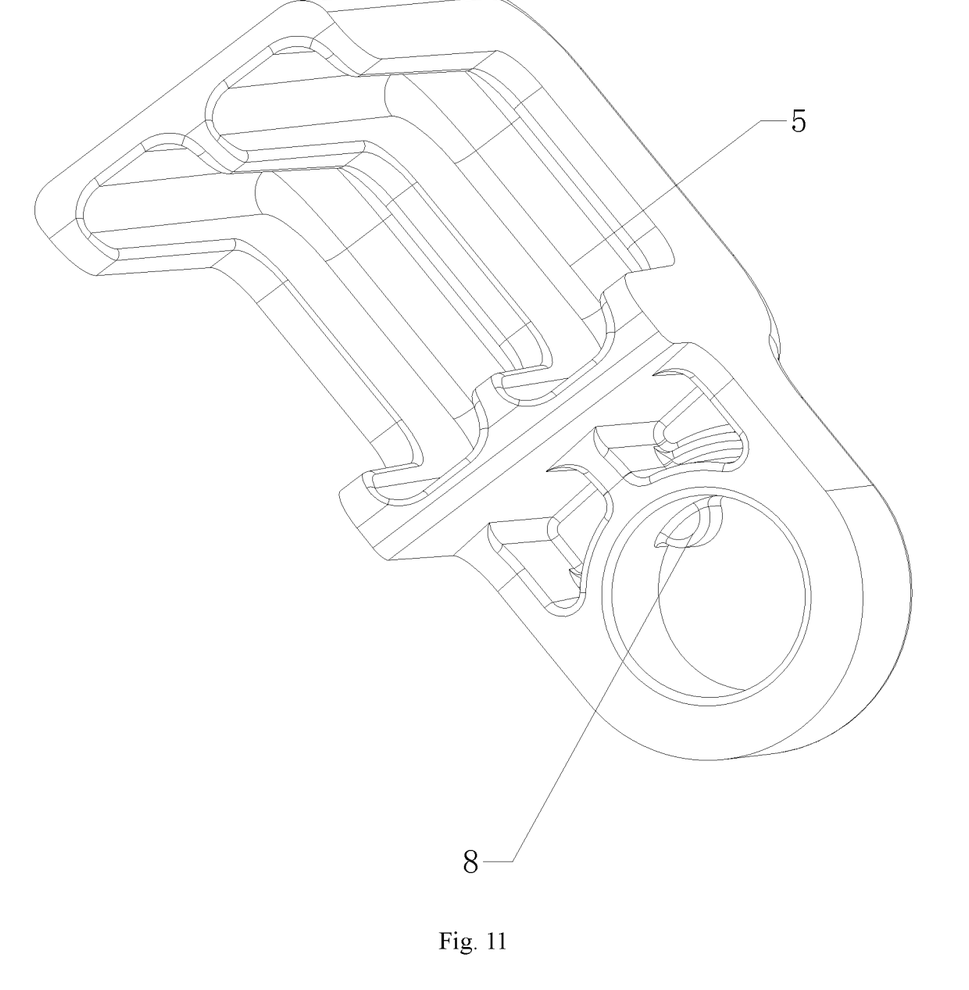
FIG. 11: the schematic diagram of the structure of the lock stem of the present invention.

The working process of the present invention: when the bicycle is unfolded and used, as shown in FIGS. 1 and 2; when the bicycle is not in use and folded, as shown in FIGS. 3 and 4. The folding steps are as follows:

Step 1: the inside of the support sleeve (14) slides up and down and is connected with the saddle support rod (15). The end of saddle support rod (15) is fixedly connected to the saddle (16), the port of the support sleeve (14) and the joint located at the support sleeve (14) and saddle support rod (15) are set with the lifting buckle #1 (17). Open the lifting buckle #1 (17), press the saddle support rod (15) into the inside of the support sleeve (14) by pressing the saddle (16). After the saddle support rod (15) is pressed into the inside of the support sleeve (14), fix it by locking lifting buckle #1 (17) to complete the folding of saddle (16);

Step 2: the port of the handlebar support tube (20) is connected with the lifting rod (22) through the lifting buckle #2 (21), and the end of the lifting rod (22) extends to the inside of the handlebar support tube (20) through the lifting buckle #2 (21), the connection mode of the lifting rod (22) and the handlebar support tube (20) is a sliding connection. Open the lifting buckle #2 (21), press the bicycle handlebar (24), and press the lifting rod (22) into the inside of the handlebar support tube (20). After the lifting rod (22) is pressed into the inside of handlebar support tube (20), fix it by locking lifting buckle #2 (21) to complete the folding of bicycle handlebar (24);

Step 3: above the connecting pillar for front fork (2), connect with handlebar support tube (20) through the folding buckle #1 (19). Open the folding buckle #1 (19) and rotate the handlebar support tube (20) to achieve the folding of handlebar support tube (20), as shown in FIG. 3;

Step 4: one side of the bicycle frame body (1) opposite to the lock stem (5) is connected to the side wall of the connecting pillar for front fork (2) and the front end of the bicycle frame body (1) through a folding buckle #3 (31). The lock stem (5) is rotated by the rotating shaft on the same side to connect with the connecting pillar for front fork (2). Open the folding buckle #3 (31), rotate the connecting pillar for front fork (2) to rotate the front fork of bicycle (3) to the position corresponding to the lock stem (5). At this time, the inside of the bayonet of the lock stem (5) and the lever of the front fork of bicycle (3) are fitted in manner of a clearance fit, and the positioning protrusion (8) is connected to the inside of the L-shaped groove (102) through sliding connection, and the return spring (7) and the outer wall of the mounting rod of lock stem (6) are fitted in manner of a clearance fit. As shown in FIGS. 4 to 11, rotate the lock stem (5), rotating the positioning protrusion (8) inside the L-shaped groove (102) by 90°. At this time, through the elastic action of return spring (7), push the lock stem (5) to tightly clamp the front fork of bicycle (3), achieve the fully folding of bicycle. Unfold the bicycle as per the above-mentioned reversed steps. According to the design, in this process, the saddle is folded, the bicycle and the handlebar are retracted and folded and the lock stem is set in sequence. The lock stem is correspondingly clamped on the front fork to tightly fix the front fork and rear fork of the bicycle together using the elasticity of the spring, which could effectively solve the problem that the folding mechanism in the folding bicycle currently available on the market is complicated, the bicycle body after being folded is larger, and the front fork and rear fork of the bicycle body cannot be put together and fixed, resulting in be difficult to carry or transport. Meanwhile, after being folded, the front wheel and the rear wheel are on the same straight line. By adjusting the height of saddle, after the height of saddle is adjusted, the movement of bicycle can be pushed, so that the portability is better and the practicability is stronger, which is more suitable for large-scale popularization and application.

Although the embodiments of the present invention have been shown and described, the ordinary technicians in the field could understand that various changes, modifications, substitutions and variations can be made to these embodiments without divorcing from the principle and spirit of the present invention. The scope of the present invention is defined by the appended claims and their equivalents.

What is claimed is:

1. A folding bicycle, comprising a bicycle frame body (1), a connecting pillar for front fork (2), a front fork of the bicycle (3), rear fork brackets of the bicycle (4), a lock stem (5), a mounting stem with a lock stem (6) and a return spring (7), characterized in that: the rear fork brackets of the bicycle (4) are set in two sets and they are respectively connected to a rear end of the bicycle frame body (1) through the rotation of rotating shaft, and a shock absorber (101) is connected between the these two sets of rear fork brackets of the bicycle (4) and is near the bicycle frame (1), said two sets of rear fork brackets of the bicycle are rotated through the rotation of rotating shaft, the shock absorber (101) is connected to a side wall of the bicycle frame body (1) through the rotation of rotating shaft, the mounting stem of the lock stem (6) is connected to a set of rear fork bracket of the bicycle (4) by bolts, the outer wall of the mounting stem of the lock stem (6) is equipped with an L-shaped groove (102), the outer wall of the mounting stem of the lock stem (6) corresponds with the L-shaped groove (102) and is connected with the lock stem (5), a positioning protrusion (8) is on the lock stem (5) and is set in the inside located at the L-shaped groove (102) and on one side of the lock stem (5) and the outer wall of the mounting rod of lock stem (6), the return spring (7) is connected and at the front end of the bicycle frame body (1), the lock stem (5) is connected with the connecting pillar for front fork (2) on the same side through the rotation of rotating shaft and the other end of the connecting pillar for front fork (2) and the corresponding lock stem (5) are connected to the front fork of the bicycle (3) through the rotation of shaft sleeve.

2. The folding bicycle according to claim 1, this folding bicycle is characterized in that the bicycle frame body (1) is connected to the rotating shaft of the bicycle (9) through the rotation of shaft sleeve, and both ends of the rotating shaft of the bicycle (9) respectively intersect the shaft sleeve and extend to the outside of the bicycle frame body (1), fixedly connecting with the pedal connection rod (10), the other end of the pedal connection rod (10) is connected with the pedal (11), and the inner side of the pedal connection rod (10) and the outer wall of the rotating shaft of the bicycle (9) is fixedly connected with the large gear disc (12), the side wall opposite to the two sets of rear fork brackets of the bicycle (4) and one side far away from the shock absorber (101) are connected to the rear wheel (13) through the rotation of connecting shaft, and the shaft centre of the rear wheel (13) is fixedly connected to the small gear disc, wherein the small gear disc is connected to the large gear disc (12) through a chain.

3. The folding bicycle according to claim 2, this folding bicycle is characterized in that the end surface of the bicycle frame body (1) is fixedly set with the support sleeve (14), the inside of the support sleeve (14) slides up and down and is connected with the saddle support rod (15) and the end of saddle support rod (15) is fixedly connected to the saddle (16), the port of the support sleeve (14) and the joint located at the support sleeve (14) and saddle support rod (15) are set with a first lifting buckle (17).

4. The folding bicycle according to claim 3, this folding bicycle is characterized in that the side wall opposite to the bottom of the front fork of the bicycle (3) is connected with the front wheel (18) through the rotation of rotating shaft, the end of the front fork of the bicycle (3) intersects the connecting pillar for front fork (2) and extends to the top of the connecting pillar for front fork (2), connecting the handlebar support tube (20) through a first folding buckle (19), and the port of the handlebar support tube (20) is connected with the lifting rod (22) through a second lifting buckle (21), and the end of the lifting rod (22) extends to the inside of the handlebar support tube (20) through the second lifting buckle (21), the connection mode of the lifting rod (22) and the handlebar support tube (20) is a sliding connection.

5. The folding bicycle according to claim 4, this folding bicycle is characterized in that the end of the lifting rod (22) is connected with the bicycle handlebar (24) through a second folding buckle (23), the bicycle handlebar (24) and the lifting rod (22) form a cross-shaped structure and the two ends of the bicycle handlebar (24) are respectively set with brake handles (25), the outside of brake handles (25) is respectively connected with an instrument (26) and a controller (27), the controller (27) is equipped with a headlamp control button, a horn control button, and a deceleration and acceleration control button, respectively, and the top of front wheel (18) and the end located at the connecting pillar for front fork (2) are connected to the headlamp (28).

6. The folding bicycle according to claim 5, this folding bicycle is characterized in that the connecting pillar for front fork (2) is of the hollow structure, and a rechargeable lithium battery is equipped inside, wherein the rechargeable lithium battery is electrically connected to the instrument (26), the controller (27) and the headlamp (28) respectively through a wire and the rear wheel (13) is motor-driven and is electrically connected to the controller (27) through a wire.

7. The folding bicycle according to claim 6, this folding bicycle is characterized in that: the rear disc brake is equipped on the other side of the rear wheel (13) and between the rear wheel (13) and the rear fork bracket of the bicycle (4) and the rear disc brake controller is correspondingly equipped on the rear fork bracket of the bicycle (4) and the rear disc brake (29), wherein the rear disc brake controller is connected to the brake handle (25) through a wire rope.

8. The folding bicycle according to claim 6, this folding bicycle is characterized in that: the front disc brake (30) is equipped on one side of front wheel (18) and between the front wheel (18) and the front fork of the bicycle (3) and the front disc brake controller is equipped on the front fork of the bicycle (3) corresponding to the front disc brake (30), wherein the front disc brake controller is connected to the brake handle (25) through a wire rope.

9. The folding bicycle according to claim 1, this folding bicycle is characterized in that: the inside of the bayonet of the lock stem (5) and the lever of the front fork of the bicycle (3) are fitted in manner of a clearance fit, and the positioning protrusion (8) is connected to the inside of the L-shaped groove (102) through sliding connection, and the return spring (7) and the outer wall of the mounting rod of lock stem (6) are fitted in manner of a clearance fit.

10. The folding bicycle according to claim 1, this folding bicycle is characterized in that one side of the bicycle frame body (1) opposite to the lock stem (5) is connected to the side wall of the connecting pillar for front fork (2) through a third folding buckle (31), the saddle support rod (15) and the support sleeve (14) are on the same straight line, and the bicycle frame body (1), the connecting pillar for front fork (2) and the rear fork bracket of the bicycle (4) are on the same straight line.

* * * * *